United States Patent
Portinari et al.

(10) Patent No.: US 10,245,797 B2
(45) Date of Patent: *Apr. 2, 2019

(54) METHOD, PROCESS AND APPARATUS FOR MANUFACTURING TYRES FOR VEHICLE WHEELS

(75) Inventors: Gianni Portinari, Milan (IT); Pietro Dale, Milan (IT); Gian Luigi Bosio, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 14/131,336

(22) PCT Filed: Jun. 27, 2012

(86) PCT No.: PCT/IB2012/053255
§ 371 (c)(1),
(2), (4) Date: Jan. 7, 2014

(87) PCT Pub. No.: WO2013/011396
PCT Pub. Date: Jan. 24, 2013

(65) Prior Publication Data
US 2014/0144574 A1    May 29, 2014

Related U.S. Application Data

(60) Provisional application No. 61/511,618, filed on Jul. 26, 2011.

(30) Foreign Application Priority Data

Jul. 15, 2011  (IT) ................ MI2011A1320

(51) Int. Cl.
*B29D 30/08* (2006.01)
*B29D 30/20* (2006.01)
(Continued)

(52) U.S. Cl.
CPC ......... *B29D 30/242* (2013.01); *B29D 30/005* (2013.01); *B29D 30/20* (2013.01);
(Continued)

(58) Field of Classification Search
CPC ............ B29D 30/005; B29D 2030/202; B29D 2030/204
(Continued)

(56) References Cited

U.S. PATENT DOCUMENTS 3,223,573 A * 12/1965 Deist ............................ 156/396
3,607,555 A *  9/1971 Leblond et al. ............... 156/396
(Continued)

FOREIGN PATENT DOCUMENTS

CN       1727173 A     2/2006
CN       1628958 A     6/2006
(Continued)

OTHER PUBLICATIONS

Machine generated English language translation of JP 2006-62251 (original document dated Mar. 2006).*
(Continued)

*Primary Examiner* — Martin K Rogers
(74) *Attorney, Agent, or Firm* — Finnegan, Henderson, Farabow, Garrett & Dunner, L.L.P.

(57) ABSTRACT

In an apparatus for building tires for vehicle wheels, a forming drum is loaded on a shuttle movable on a guide along a deposition line. The shuttle is moved on the guide in the two running directions to bring it to dispensing stations of semifinished products disposed in at least some deposition locations positioned in space succession along the deposition line. At each of the dispensing stations, at least one semifinished product is laid on a radially external surface to the forming drum carried by the shuttle for forming at least one component of a tire. The shuttle is (Continued)

moved on the guide in a different sequence from the space succession of the deposition locations along the deposition line.

11 Claims, 5 Drawing Sheets

(51) Int. Cl.
    *B29D 30/24*     (2006.01)
    *B29D 30/00*     (2006.01)
    *B29D 30/30*     (2006.01)

(52) U.S. Cl.
    CPC .......... *B29D 30/244* (2013.01); *B29D 30/30* (2013.01); *B29D 2030/202* (2013.01); *B29D 2030/204* (2013.01)

(58) Field of Classification Search
    USPC .................................................. 156/111, 396
    See application file for complete search history.

(56) References Cited

U.S. PATENT DOCUMENTS

| | | | | |
|---|---|---|---|---|
| 3,647,126 | A * | 3/1972 | Dieterich et al. | 226/105 |
| 3,720,569 | A * | 3/1973 | Kimble | B29D 30/3035 428/108 |
| 5,354,404 | A * | 10/1994 | Benjamin | 156/362 |
| 5,411,626 | A * | 5/1995 | Coretta et al. | 156/396 |
| 7,195,047 | B2 * | 3/2007 | Sieverding et al. | 156/396 |
| 7,770,622 | B2 * | 8/2010 | Caretta et al. | 156/396 |
| 2003/0056877 | A1 | 3/2003 | Zeh et al. | |
| 2003/0170336 | A1 * | 9/2003 | Caretta et al. | 425/340 |
| 2005/0126684 | A1 | 6/2005 | Sieverding et al. | |
| 2005/0133149 | A1 * | 6/2005 | Sieverding | B29D 30/0601 156/130.5 |
| 2005/0145315 | A1 * | 7/2005 | Villanueva | B60C 9/2204 152/531 |
| 2006/0021692 | A1 | 2/2006 | Miki | |
| 2006/0144500 | A1 | 7/2006 | Lacagnina | |
| 2007/0175567 | A1 | 8/2007 | Stahl | |
| 2008/0142150 | A1 | 6/2008 | Robert | |
| 2009/0097044 | A1 * | 4/2009 | Zach | B41J 3/4078 358/1.8 |
| 2009/0314401 | A1 * | 12/2009 | Hitotsuyanagi | B29D 30/3028 152/152.1 |
| 2010/0032864 | A1 * | 2/2010 | Marchini | B29D 30/005 264/241 |
| 2010/0089519 | A1 * | 4/2010 | Slots | 156/111 |
| 2010/0307662 | A1 | 12/2010 | Mancini et al. | |
| 2011/0168322 | A1 * | 7/2011 | Mariani et al. | 156/111 |
| 2011/0290403 | A1 * | 12/2011 | D'ambrosio et al. | 156/111 |

FOREIGN PATENT DOCUMENTS

| | | | |
|---|---|---|---|
| CN | 101146669 A | 3/2008 | |
| EP | 0 555 813 A1 | 8/1993 | |
| EP | 0776756 A2 | 6/1997 | |
| EP | 1 295 701 A2 | 3/2003 | |
| EP | 1 541 325 A2 | 6/2005 | |
| JP | 10-217355 | 8/1998 | |
| JP | 2003-251708 * | 9/2003 | ............. B29D 30/00 |
| JP | 2005-170044 | 6/2005 | |
| JP | 2006-001024 * | 1/2006 | ............. B29D 30/08 |
| JP | 2006-62251 * | 3/2006 | ............. B29D 30/24 |
| JP | 2010-506766 | 3/2010 | |
| WO | WO 2004/041521 A1 | 5/2004 | |
| WO | WO 07/055695 * | 5/2007 | ............. B29D 30/20 |
| WO | WO 2009/040594 A1 | 4/2009 | |
| WO | WO 09/157028 * | 12/2009 | ............. B29D 30/00 |
| WO | WO 2010/070374 A1 | 6/2010 | |

OTHER PUBLICATIONS

Machine generated English language translation of JP 2003-251708 (original document dated Sep. 2003).*
Machine generated Engish language tranlsation of JP 2006-001024 (original document dated Jan. 2006).*
International Search Report from the European Patent Office for International Application No. PCT/IB2012/053255, dated Oct. 18, 2012.
Written Opinion of the International Searching Authority from the European Patent Office for International Application No. PCT/IB2012/053255, dated Oct. 18, 2012.
Notice of Reasons for Rejection issued by the Japanese Patent Office dated Aug. 8, 2014, for corresponding Japanese Application No. 2014-519651.
Office Action issued from the State Intellectual Property Office of the People's Republic of China in corresponding Application No. 201280033897.7, dated May 28, 2015, 17 pages.
Office Action dated Oct. 5, 2016 in copending Japanese Patent Application 2014-519651.
Office Action dated Aug. 12, 2016 in copending divisional Japanese Patent Application 2015-147222.
Translation of Decision on Grant issued by the Federal Service of Intellectual Property of the Russian Federation in corresponding Application No. 2013158715/05 (091449), , dated May 24, 2016.
Examination Report from the INPI Argentina, in counterpart Argentina Application No. P20120102539 dated Nov. 16, 2017.

* cited by examiner

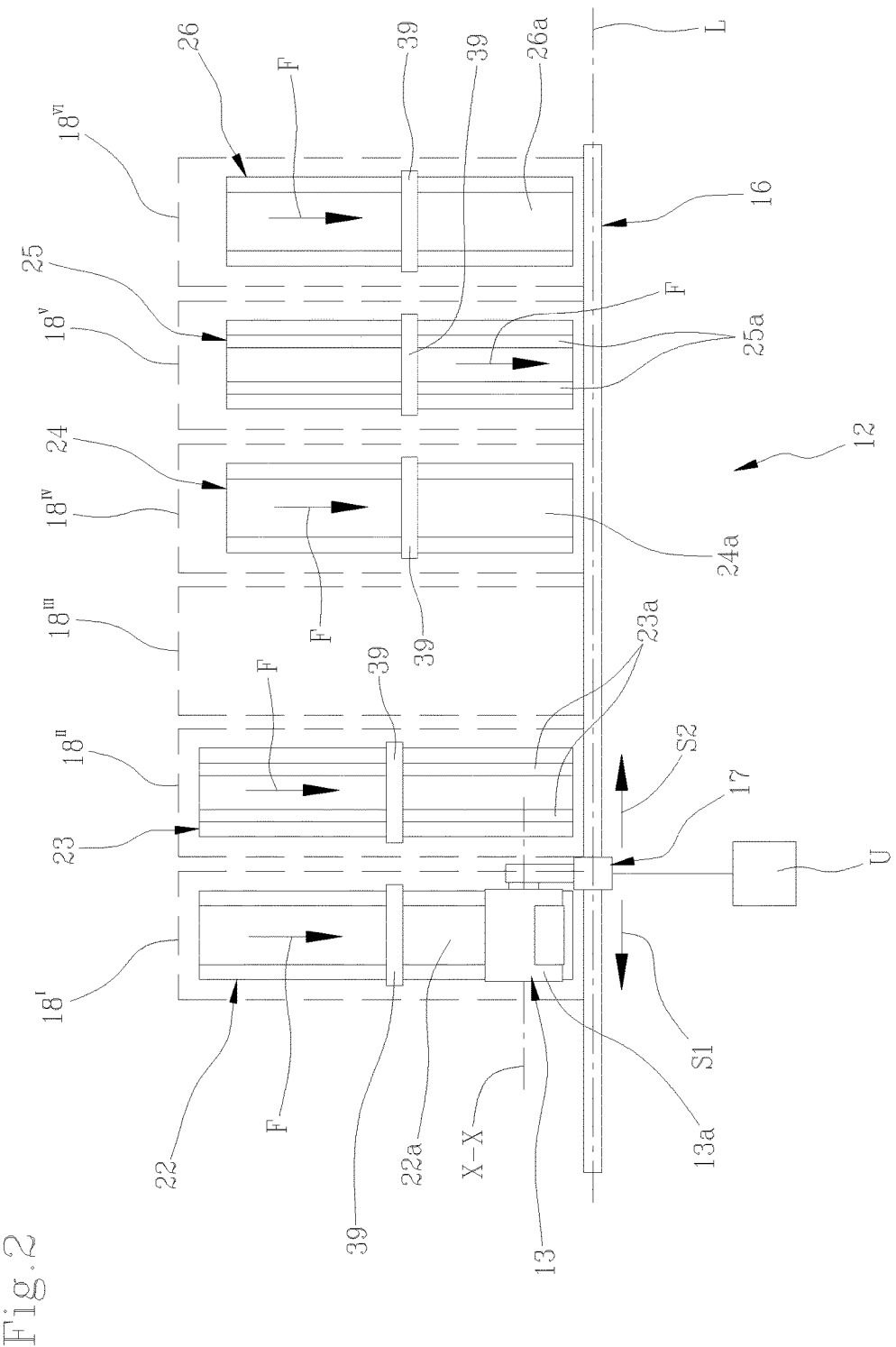

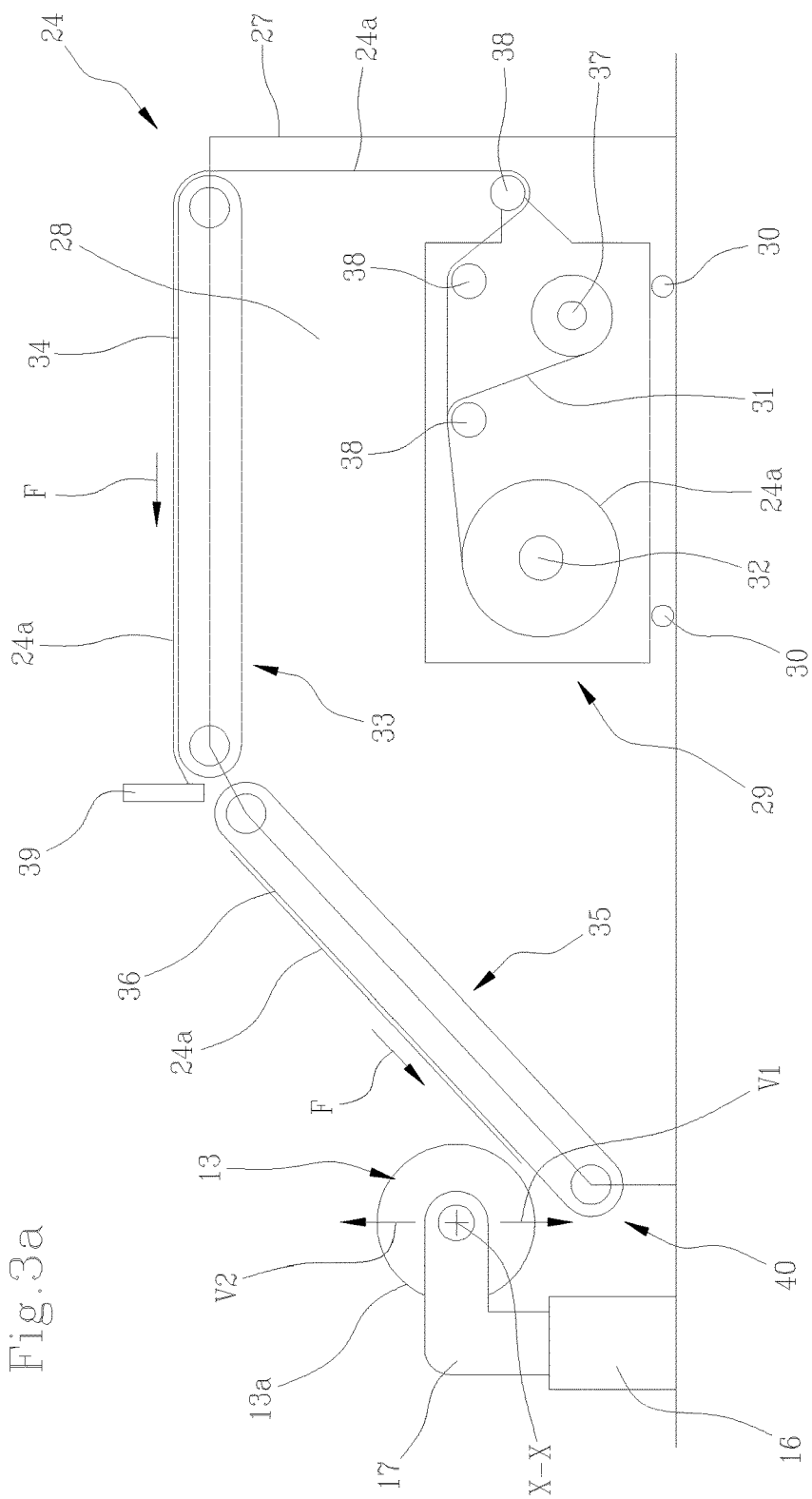

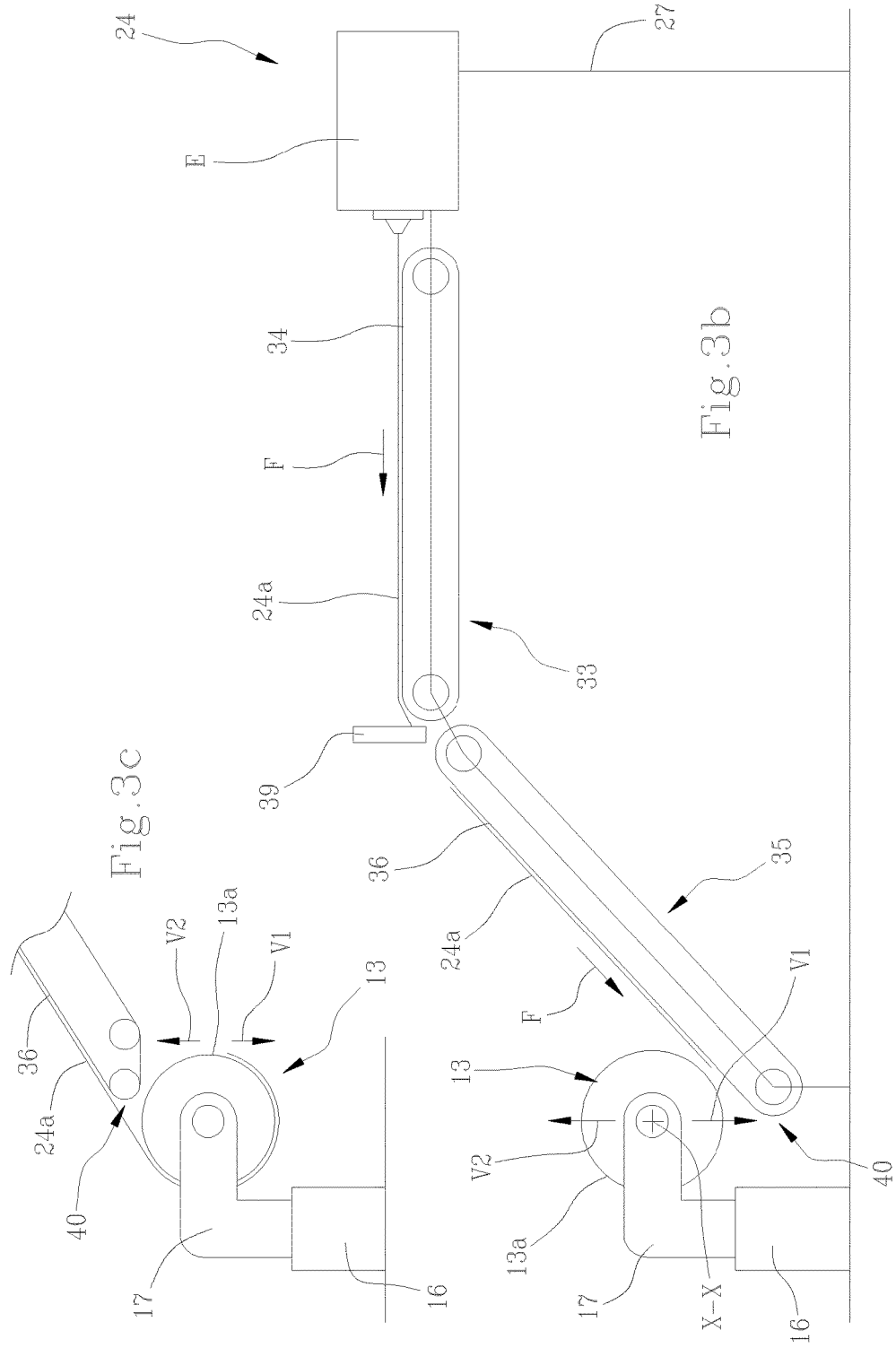

METHOD, PROCESS AND APPARATUS FOR MANUFACTURING TYRES FOR VEHICLE WHEELS

CROSS REFERENCE TO RELATED APPLICATIONS

This application is a national phase application based on PCT/IB2012/053255, filed Jun. 27, 2012, which claims the priority of Italian Patent Application No. MI2011A001320, filed Jul. 15, 2011, and the benefit of U.S. Provisional Application No. 61/511,618, filed Jul. 26, 2011, the content of each application being incorporated herein by reference.

FIELD OF THE INVENTION

The present invention relates to a method, a process and an apparatus for building tyres for vehicle wheels.

BACKGROUND ART

A tyre for vehicle wheels generally comprises a carcass structure including at least one carcass ply having respectively opposite end flaps in engagement with respective annular anchoring structures, generally referred to as "bead cores", integrated into the regions usually identified as "beads", having an inner diameter substantially corresponding to a so-called "fitting diameter" of the tyre on a respective mounting rim. The tyre further comprises a crown structure including at least one belt strip placed at a radially external position to the carcass ply, and a tread band radially external to the belt strip. A so-called "under-layer" of elastomeric material can be interposed between the tread band and the belt strip/s, which under-layer has properties adapted to ensure steady union of the belt strip/s with the tread band. In addition, respective sidewalls of elastomeric material are applied onto the side surfaces of the carcass structure, each extending from one of the side edges of the tread band to close to the respective annular anchoring structure to the beads. In tyres of the "tubeless" type, the carcass ply is internally coated with a layer of preferably butyl-based elastomer material usually referred to as "liner", which has optimal airtightness features and extends from one of the beads to the other.

It should be pointed out, to the aims of the present specification and the following claims, that the term "elastomeric material" is understood as indicating a composition comprising at least one elastomeric polymer and at least one reinforcing filler. Preferably, this composition further comprises additives such as a cross-linking agent and/or a plasticiser, for example. Due to the presence of the cross-linking agent, this material can be cross-linked through heating, so as to form the final article of manufacture.

In the present specification and the following claims, the term "component" of the tyre means any functional component of the tyre (such as, for example, under-liner, liner, carcass ply/plies, fillers in the bead region, belt layer/s, sidewalls, sidewall inserts in run-flat tyres, abrasion-proof inserts, under-layer, tread band, textile or metallic reinforcing elements, reinforcing elements of elastomeric material, etc.) or a portion thereof.

In the present specification and in the appended claims, the term "semifinished product" means an elongated element, of elastomeric material alone or comprising other structural elements, distributed on a forming drum to form a tyre component.

The semifinished product is preferably defined by a continuous elongated element in the form of a strip. Preferably, said semifinished product is cut to size and has flattened cross section.

Said semifinished product is made of elastomeric material preferably incorporating one or more textile or metallic reinforcing cords. These textile or metallic reinforcing cords are disposed either parallel to each other in the longitudinal direction of the elongated element itself or inclined to said longitudinal direction.

Said continuous elongated element is preferably circumferentially fed onto a forming drum, from a reel or an extruder for example.

In the present description and in the following claims by "deposition line" it is intended an open path, that is not endless, extending between a first end and a second end.

Preferably said deposition line is a substantially straight path.

In the present specification and in the following claims, the expression "space succession" of "n" deposition locations is understood as indicating the physical positioning of said "n" deposition locations disposed one after the other along the deposition line between the first end and the second end, in which each deposition location except the final ones (i.e. the first and last ones) is adjacent to two different deposition locations, a preceding one and a following one, the first deposition location being adjacent to and preceding the second deposition location and the last deposition location being adjacent to and following the last but one deposition location.

Document EP 0 555 813 in the name of the same Applicant shows a plant for manufacturing carcass structures for vehicle wheels comprising a plurality of building drums moved along an assembling path. Each drum, following a predetermined succession, meets a number of primary work stations, each adapted to apply a respective common main component to a plurality of carcass types, alternated with auxiliary work stations adapted to apply accessory components. Each auxiliary work station can be removed and replaced with a different station based on the type of process to be carried out and is movable between a rest position at which it is perpendicularly moved away from the assembling path, and a work position at which it is operatively disposed along the assembling path, to carry out application of the respective accessory component. The primary work stations can be moved close to and away from each other along the assembling path.

Document US 2007/0175567 shows a machine for building tyres comprising a carcass line and a belt/tread line operating simultaneously. Each carcass is joined to a respective belt/tread in an endless assembling line. In the carcass line, building drums are fed in succession along an assembling path through a plurality of stations for component application. In the belt/tread line, cylinders on which the belt/tread package are assembled are fed through further stations for component application. In each component-application station, tyre components used to form parts of the carcass and the belt/tread respectively, are laid on the drum or the cylinder.

SUMMARY OF THE INVENTION

The Applicant has noticed that in plants of the type depicted in US 2007/0175567 the type of the devices forming the plant and the location of same are unequivocally determined during planning and manufacture of the plants themselves. As a result, the types of the semifinished products applied onto the drums are unique too, as well as the application order of the same, from which a substantially unique structure of the produced tyres results.

The Applicant has also noticed that in other plants of the type disclosed in document EP 0 555 813, although some work stations can be shifted and/or replaced, the plant flexibility is at all events limited, due to the fact that the drums move forward one after the other through the work stations disposed in succession.

In this context, the Applicant intends to increase the flexibility of the plants for tyre production.

In particular, the Applicant has perceived the importance of building structurally different tyres without modifying the plant but merely changing the procedure or recipe and enabling, in the same plant, deposition of semifinished products at different radial and/or axial positions on the forming drum in accordance with said recipe.

In addition, the Applicant wishes to make it possible to modify the plant structure (reconditioning) by relatively simple, quick and inexpensive operations, in order to enable production of tyre batches different from each other, manufacture of new types of tyres or application of new technologies.

The Applicant also aims at easily remedying possible stops of one or more of the plant devices due to temporary plant failure and/or depletion of the semifinished products, for example.

The Applicant has therefore perceived that for reaching the intended purposes, the building sequence of a tyre under production on its own forming drum had to become controllable and modifiable irrespective of the number, type and arrangement of the stations for dispensing the semifinished products available along a building line.

The Applicant has finally found that by moving a single forming drum at a time along a deposition line, intended to receive part or all of the tyre components in the form of semifinished products, between a plurality of dispensing devices of said semifinished products, following a sequence that is programmable depending on requirements and not rigidly bound to the space arrangement of the dispensing devices inside the deposition line, it is possible to overcome the above mentioned drawbacks, obtaining flexibility and reliability of the corresponding production plant in the different operating contexts linked to the different tyres under production.

More specifically, in a first aspect, the present invention relates to a method of building tyres for vehicle wheels, comprising:
  arranging a dispensing station of semifinished products in "m" of "n" deposition locations, positioned in a space succession along a deposition line, where "n" is greater than or equal to "m";
  loading a forming drum onto the deposition line at a loading and unloading location;
  moving the forming drum between "s" of said "m" deposition locations, where "s" is smaller than or equal to "m", wherein in each of said "s" deposition locations at least one semifinished product dispensed from the respective dispensing station of semifinished products is laid on a surface radially external to the forming drum so as to form at least one component of the tyre;
  bringing back the forming drum provided with the components of the tyre to said loading and unloading location and unloading it from the deposition line before loading a subsequent forming drum;
wherein said forming drum is moved in a sequence different from the space succession of said "n" deposition locations along the deposition line.

It is therefore the Applicant's opinion that, given a certain number "n" of deposition locations placed along the deposition line, all the deposition locations or only some of said deposition locations are occupied by respective "m" dispensing stations and the forming drum can be moved and stopped in any sequence at each dispensing station or only at some of said dispensing stations for receiving the respective semifinished products. In this way, flexibility and reliability of the production plant are increased.

In a second aspect, the present invention relates to a process for building tyres for vehicle wheels, comprising:
forming components of a tyre on a forming drum, wherein said components are formed by:
  loading the forming drum, at a loading and unloading location, on a shuttle movable along a deposition line;
  moving the shuttle on the deposition line to bring it to at least some of a plurality of dispensing stations of semifinished products disposed in at least some deposition locations positioned in space succession along the deposition line;
wherein at each of said at least some dispensing stations of semifinished products, at least one semifinished product is laid on a radially external surface of the forming drum carried by the shuttle for forming at least one component of the tyre;
  bringing the forming drum provided with the tyre components back to said loading and unloading location and unloading it from said shuttle before loading a subsequent one of said forming drums;
wherein the shuttle is moved in a sequence different from the space succession of said deposition locations along the deposition line, between said at least some dispensing stations of semifinished products.

In accordance with a third aspect, the present invention relates to an apparatus comprising:
  a guide at a deposition line;
  a shuttle movable along said guide in two running directions and capable of carrying a respective forming drum;
  a location for loading and unloading the forming drum onto or from the shuttle positioned close to the guide;
  a plurality of dispensing stations of semifinished products disposed in at least some deposition locations positioned in a space succession along the guide, wherein each of said dispensing stations of semifinished products is able to lay at least one semifinished product on a radially external surface of the forming drum carried by the shuttle for forming at least one component of the tyre;
  a control unit operatively connected to said shuttle to move it on the guide in the two running directions and stop it at said loading and unloading location and at each of said dispensing stations of semifinished products in a sequence different from the space succession of said deposition locations along said guide.

The Applicant thinks that at the single loading and unloading location the shuttle transfers a forming drum provided with at least part of the tyre components to suitable devices and receives an empty forming drum. This solution allows the apparatus to be organised in such a manner that it is compact and takes up relatively small room.

The Applicant also thinks that the forming drum on board the shuttle is able to be moved quickly between the dispensing stations and positioned at each dispensing station of semifinished products following any sequence corresponding to the sequence of the materials defined in the recipe.

In fact, the sentence "in a sequence different from the space succession of said "n" deposition locations" in the present context means that the drum movement does not follow the space succession of the deposition locations, but can: skip one or more of said deposition locations (that may be empty or occupied by respective dispensing stations) and/or be first brought to the farthest ones from the loading and unloading station and then back to the closest ones and/or change the running direction along the deposition line once or several times.

The present invention, in at least one of said aspects, can further have one or more of the preferred features hereinafter described.

According to an embodiment of the method, the forming drum is brought "t" times to one and the same deposition location of said "s" deposition locations, where "t" is equal to or greater than two.

Preferably "t" is equal to or smaller than three.

By bringing the drum several times to the same deposition location, the method of the invention allows the same semifinished product to be laid at different radial positions on the forming drum, thus maximising the plant flexibility.

Preferably, the tyre components include a component belonging to a carcass structure.

Preferably, the running direction of said forming drum is reversed at least twice during shifting of said forming drum between said "s" of said "m" deposition locations.

The space position of the different dispensing stations along the deposition line does not limit the apparatus versatility exactly because the drum can be shifted to and fro, so that it can reach each of the dispensing stations in a quick manner.

Preferably, before loading said subsequent forming drum, the value of "s" is changed.

Preferably, before loading said subsequent forming drum, the value of "m" is changed.

Between the production cycle of a batch and the following one or even within the same production cycle, the "m" number, the type and position of the installed dispensing stations can be changed, as well as the "s" number of dispensing stations reached by the forming drum during processing.

Preferably, "n" is greater than or equal to four. Preferably, "n" is smaller than or equal to ten.

Preferably, "m" is greater than or equal to three. Preferably, "m" is smaller than or equal to ten.

Preferably, "s" is greater than or equal to three. Preferably, "s" is smaller than or equal to ten.

According to a preferred embodiment of the process, the running direction of said shuttle is reversed at least twice during movement of said shuttle along the deposition line.

In accordance with a preferred embodiment of the process, the loading and unloading location is disposed at the end of the deposition line. This solution enables also other elements of the plant that have to interact with each other for building the entire tyre to be positioned with ease around the loading and unloading location.

According to a preferred embodiment of the process, deposition of the semifinished product on the radially external surface comprises:
 moving the forming drum close to a conveying surface of the dispensing station movable along a feeding direction;
 feeding the semifinished product onto said conveying surface;
 setting the forming drum in rotation for receiving the semifinished product on the radially external surface.

Deposition of the semifinished product on the forming drum is quick and relatively simple.

Preferably, the forming drum is moved close to a final end of the conveying surface from top to bottom.

According to a different preferred embodiment, the forming drum is moved close to a final end of the conveying surface from bottom to top.

Selection between the two preferred solutions also depends on the type of semifinished product to be laid. For instance, when deposition of strips of self-sealing material (for self-sealing tyres) having a sticky face and a less sticky one is concerned, the less sticky face of this strip must, for obvious reasons, rest on the conveying surface of the dispensing station and the same less sticky face must be put against the radially external surface of the forming drum. Therefore, the final end of the conveying surface of the dispensing station is moved close to the forming drum from the top so as to enable passage of the non-sticky face from said conveying surface onto the forming drum.

Preferably, the tyre components include a component that belongs to a carcass structure.

The dispensed semifinished products are for example: the complex-liner (liner, under-liner and abrasion-proof elongated elements), sidewall inserts, first carcass ply, edges and second carcass ply.

According to a different embodiment, the tyre components include a component that belongs to a belt structure.

Preferably, before forming the components on the forming drum, the moving sequence of the shuttle is changed.

Preferably, before forming the components on the forming drum, at least one dispensing station of semifinished products is replaced in a deposition location.

Preferably, before forming the components on the forming drum, at least one dispensing station of semifinished products is added in a deposition location.

Preferably, before forming the components on the forming drum, at least one dispensing station of semifinished products is removed from a deposition location.

Preferably, before forming the components on the forming drum, at least one dispensing station of semifinished products changes the deposition location along the deposition line.

The process contemplates modification of the type of the dispensed semifinished products and/or the sequence by which they are dispensed through removal, addition, replacement, exchange of the dispensing stations, to enable easy passage from the production of a tyre type or design to that of a different type.

Preferably, the loading and unloading location is placed at a final end of the guide.

Management of the forming drums relies on devices concentrated on a region close to the guide end, so that the apparatus is compact.

In accordance with a preferred embodiment of the apparatus, said deposition locations are positioned consecutively on at least one of two sides of the guide.

Preferably, the dispensing stations of semifinished products are installed in a removable manner in the deposition locations.

The apparatus is provided with individual dispensing stations that are disposed substantially in side by side relationship and are removable. Due to this arrangement, the apparatus can be easily reconditioned for new technologies and/or new products, and may be also amplified by mere addition of further dispensing stations. The operations of maintenance/repair are also facilitated by the fact that the dispensing stations of semifinished products can be moved away from the line.

According to a preferred embodiment, at least one of the dispensing stations of semifinished products comprises a conveying surface of the semifinished product movable along a feeding direction.

Preferably, said dispensing station of semifinished products comprises a cutting device for cutting to size the semifinished product fed onto the conveying surface.

This structure is simple and relatively cheap and allows the semifinished product to be dispensed and applied in a simple and quick manner. Preferably, all the dispensing stations are structured in this way.

Preferably, said dispensing station of semifinished products comprises a reel-holder carrying a reel on which the semifinished product is wound.

The semifinished product is produced separately, coupled to a service fabric adapted to avoid adhesion between the turns and ageing, then wound up into a coil and kept this way until use in the apparatus.

According to a preferred embodiment, said dispensing station of semifinished products comprises a frame carrying the conveying surface, the apparatus comprising a plurality of carriages, each carrying a reel-holder carrying a reel on which the semifinished product is wound and adapted to be housed in the frame in a removable manner.

In this manner, replacement of the used-up reel-holder is very simple and quick.

Preferably, the conveying surface has at least one portion inclined to the guide and the reel-holder can be housed under the conveying surface.

Thus, bulkiness of the dispensing station of semifinished products as a whole is reduced to the minimum.

In an alternative embodiment, said dispensing station of semifinished products comprises an extruder delivering the semifinished product onto the conveying surface.

In this case, the semifinished product is produced and immediately laid on the forming drums.

Preferably, a final end of the conveying surface is disposed at the guide.

Each forming drum carried by the shuttle at the final end of the conveying surface and disposed close to said final end is already ready to receive the semifinished product.

In an embodiment, a final end of the conveying surface is disposed under the forming drum carried by the shuttle.

In a further preferred embodiment, a final end of the conveying surface is disposed over the forming drum carried by the shuttle.

In an embodiment, the shuttle is movable along a direction striking on a longitudinal extension of the guide between a first position at which the radially external surface of the forming drum approaches the final end of the conveying surface and a second position at which said axially external surface is away from said final end.

Preferably, said direction is orthogonal to said longitudinal extension of the guide.

This displacement is of few centimeters and enables the drum to rest against the semifinished product so that the latter will correctly adhere to the drum during winding.

Preferably, the shuttle comprises devices for setting the forming drum in rotation around the rotation axis thereof for receiving the semifinished product delivered by the dispensing station of semifinished products.

The shuttle is provided with actuating devices for setting the drum in rotation and move it along said orthogonal direction.

Preferably, said dispensing station of semifinished products comprises at least one conveyor belt including said conveying surface.

The conveyor belt provides a continuous rest surface to the semifinished product.

BRIEF DESCRIPTION OF DRAWINGS

Further features and advantages will become more apparent from the detailed description of a preferred but not exclusive embodiment of a method, a process and an apparatus for building tyres for vehicle wheels, in accordance with the present invention.

This description will be set out hereinafter with reference to the accompanying drawings, given by way of non-limiting examples, in which:

FIG. 2 is a view of a portion of the apparatus seen in FIG. 1 according to an alternative embodiment;

FIG. 3a is an elevation side view of an element of the apparatus in FIG. 2;

FIG. 3b shows a variant of the element seen in FIG. 3a;

FIG. 3c shows a portion of a further variant of the element in FIG. 3a;

DETAILED DESCRIPTION OF PREFERRED EMBODIMENTS OF THE INVENTION

Figure 1:
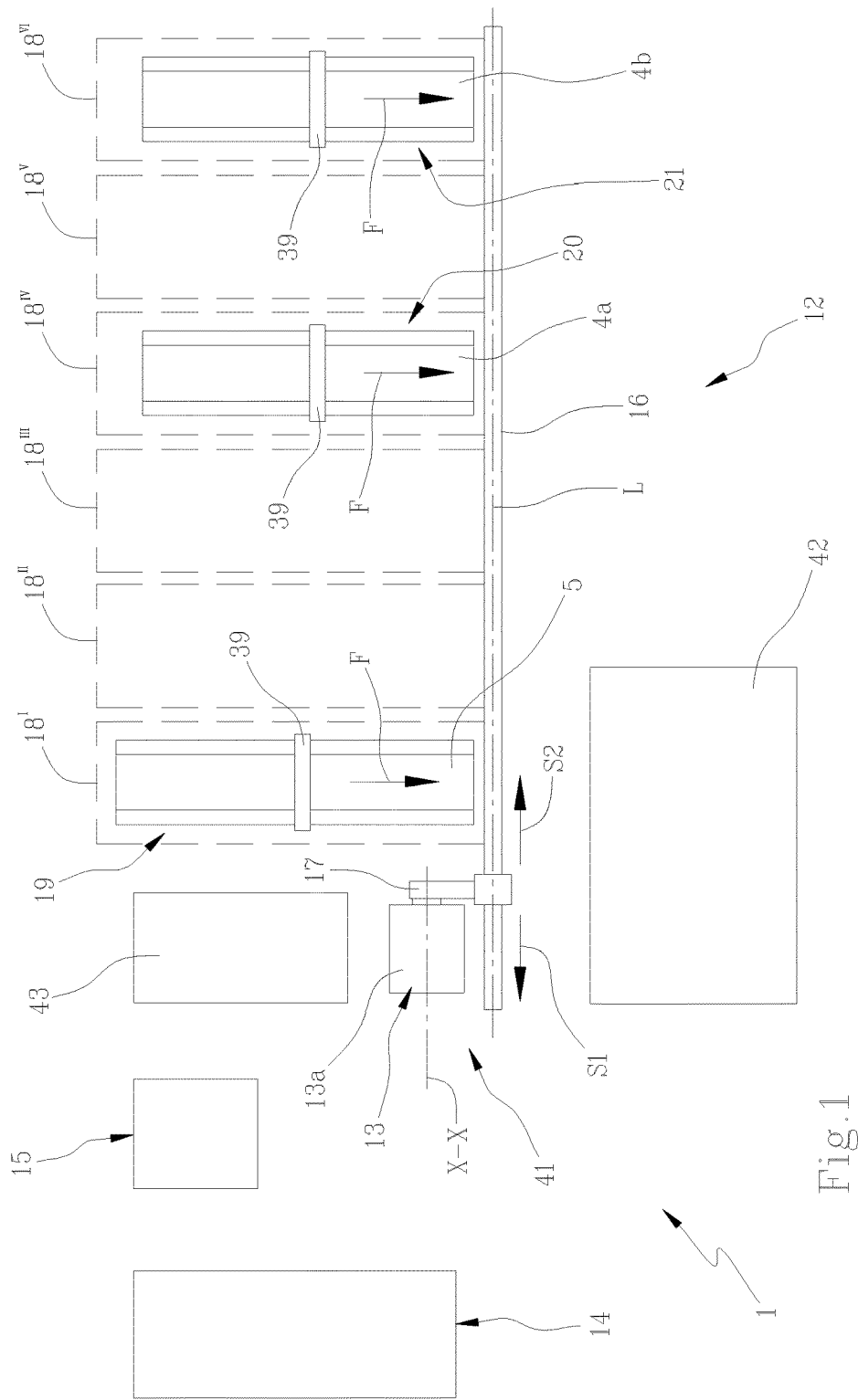
FIG. 1 diagrammatically shows a plan view of an apparatus for manufacturing tyres for vehicle wheels according to the present invention.

With reference to FIG. 1, an apparatus for building tyres for vehicle wheels in accordance with the present invention has been generally identified with reference numeral 1.

Figure 4:
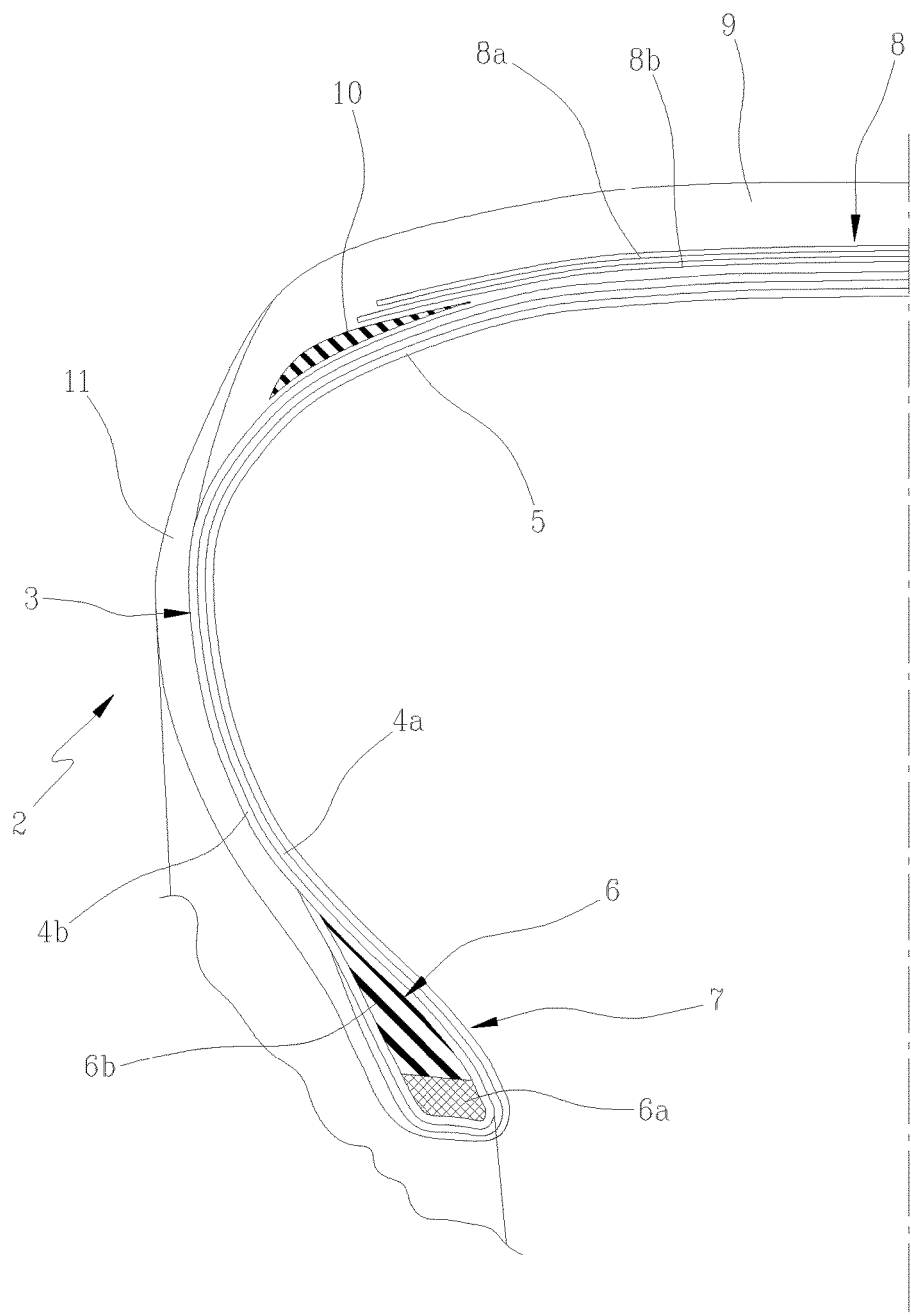
FIG. 4 is a radial half-section of a tyre built using the apparatus seen in FIG. 1.

A tyre 2, manufactured in said apparatus and using the method and the process according to the present invention, is shown in FIG. 4 and it essentially comprises a carcass structure 3 having two carcass plies 4a, 4b. A layer of airtight elastomeric material or so-called liner 5 is internally applied to the carcass ply/plies 4a, 4b. Two annular anchoring structures 6, each comprising a so-called bead core 6a carrying an elastomeric filler 6b at a radially external position, are in engagement with respective end flaps of the carcass ply/plies 4a, 4b. The annular anchoring structures 6 are integrated in the vicinity of regions usually referred to as "beads" 7, at which usually engagement of the tyre 2 with a respective mounting rim occurs. A belt structure 8 comprising several belt layers 8a, 8b is circumferentially applied around the carcass plies 4a, 4b and a tread band 9 circumferentially overlaps the belt structure 8.

So-called "under-belt" inserts 10 can be associated with the belt structure 8 and each of them is placed between the carcass plies 4a, 4b and one of the axially opposite end edges of the belt structure 8. Two sidewalls 11, extending each from the corresponding bead 7 to a corresponding side edge of the tread band 9, are applied at laterally opposite positions to the carcass plies 4a, 4b.

Said components of tyre 2 are manufactured on one or more drums shifting said drums between different dispensing stations of semifinished products at each of which suitable devices apply the aforesaid semifinished products onto the forming drum or drums.

The apparatus 1 shown in the accompanying figures comprises a carcass-building line 12, at which forming drums 13 are moved between different dispensing stations of semifinished products provided to form, on each forming drum 13, a carcass sleeve comprising the carcass plies 4a, 4b, liner 5, annular anchoring structures 6 and possibly at least part of the sidewalls 11.

Simultaneously, in an outer-sleeve building line 14, one or all auxiliary drums are sequentially moved between different work stations designed to form an outer sleeve on each auxiliary drum, which outer sleeve comprises at least the belt structure 8, tread band 9 and possibly at least part of the sidewalk 11.

The apparatus further comprises an assembling station 15 at which the outer sleeve is coupled to the carcass sleeve.

The built tyres 2 are finally transferred to at least one vulcanisation and moulding unit, not shown.

The carcass-building line 12 comprises a guide 16 preferably extending straight along a deposition line "L". Mounted on guide 16 is a shuttle 17 capable of moving, driven by a suitable motor not shown, along guide 16 and in both the running directions "S1", "S2". Shuttle 17 is able to support a forming drum 13 at a time, and rotate it around a rotation axis "X-X" coincident with the longitudinal symmetry axis of the drum 13 itself and with the rotation axis of tyre 2 under production. In the embodiment shown, the drum 13 is carried in overhanging by shuttle 17, which comprises a grip element adapted to retain or release a final end of a central shaft of the forming drum 13.

Alongside guide 16 and preferably, as shown, on a side alone of the latter, deposition locations 18i, 18ii, 18iii, 18iv, 18v, 18vi are present (six in number in the example in FIGS. 1 and 2) which are disposed consecutively after each other. More generally, in other variants of the apparatus, not shown, the "n" number of the deposition locations can be preferably included between four and ten.

At least some of said deposition locations 18i, 18ii, 18iii, 18iv, 18v, 18vi house each a respective dispensing station of a semifinished product. More generally, preferably, the "m" number of deposition locations 18i, 18ii, 18iii, 18iv, 18v, 18vi occupied by a dispensing station is preferably included between three and ten.

As shown in the accompanying FIG. 1, a first deposition location 18i houses a dispensing station 19 for supplying liner 5, a second deposition location 18ii and a third deposition location 18iii are empty, a fourth deposition location 18iv houses a dispensing station 20 for supplying the first carcass ply 4a, a fifth deposition location 18v is empty and a sixth deposition location 18vi houses a dispensing station 21 for supplying the second carcass ply 4b. The apparatus shown in FIG. 1 is therefore provided for building tyre 2 shown in FIG. 4.

According to an alternative embodiment shown in the accompanying FIG. 2, the first deposition location 18i houses a dispensing station 22 for feeding the complex-liner 22a (intended as single semifinished product comprising liner, under-liner and abrasion-proof elongated elements), the second deposition location 18ii houses a dispensing station 23 for feeding sidewall inserts 23a, the third deposition location 18iii is empty, the fourth deposition location 18iv houses a dispensing station 24 for feeding a first carcass ply 24a, the fifth deposition location 18v houses a dispensing station 25 for feeding edges 25a and the sixth deposition location 18vi houses a dispensing station 26 for feeding a second carcass ply 26a. The apparatus shown in FIG. 2 is therefore intended for building the run-flat tyre, not shown.

Each of the mentioned dispensing stations 19, 20, 21, 22, 23, 24, 25, 26 substantially has the same structure as diagrammatically shown in FIG. 3a with reference to the dispensing station 24 for the first carcass ply 24a of FIG. 2, so that in the following the same reference numerals of the components of the dispensing station 24 will be used for the corresponding components of the other dispensing stations of semifinished products.

This dispensing station 24 comprises a frame 27 lying in the respective fourth deposition location 18iv. Frame 27 can be locked in the respective fourth location 18iv during the work steps and can be removed away from said fourth location 18iv, preferably by means of wheels not shown, secured to the frame 27 itself in a removable manner. Frame 27 internally delimits a space 28 designed to house a carriage 29 movable on wheels 30. The carriage 29 carries the semifinished product (in the concerned case the first carcass ply 24a) coupled to a service fabric 31 and wound up into a coil on a rotatable reel-holder 32 freely rotating or powered.

At an upper portion of frame 27, above the space 28 for carriage 29, a first conveyor belt 33 is placed which has a horizontal upper conveying surface 34. This horizontal upper conveying surface 34 is moved forward along a feeding direction "F". Downstream of the first conveyor belt 33, relative to said feeding direction "F", a second conveyor belt 35 is consecutively disposed, which has an upper conveying surface 36 inclined downwards starting from the first conveyor belt 33. This inclined upper conveying surface 36 is moved forward along the feeding direction "F". The two upper conveying surfaces 34, 36 define an overall conveying surface for the semifinished product wound into a coil in carriage 29, which extends starting from a rear portion of the dispensing station 24 and ends at the guide 16, when the dispensing station 24 is installed in the respective deposition location 18iv. In a plan view (FIGS. 1 and 2), the feeding direction "F" is perpendicular to said guide 16.

The semifinished product 24a is unwound from the reel and separated from the service fabric 31. The service fabric 31 is wound up on a respective collecting reel 37. The semifinished product 24a forms a festoon and is then guided and directed, from bottom to top, to the horizontal upper conveying surface 34, at the rear portion of the dispensing station 24, by means of guide elements 38 (rollers for example) carried by the carriage and/or installed on frame 27.

In a variant, shown in FIG. 3b, a semifinished product of a type different from the carcass ply 24a, is directly delivered onto the conveying surfaces 34, 36 by an extruder "E".

Positioned on top of the conveyor belts 33, 35 is a cutting device 39 for cutting to size the semifinished product 24a fed onto the conveying surface. The cutting device 39 diagrammatically shown in FIG. 3a is placed between the first and second conveyor belts 33, 35.

A final end 40 of the second conveyor belt 35 is positioned close to guide 16 so that the shuttle 17 and drum 13 carried thereby can be disposed above a final end of the overall conveying surface 34, 36. As the shuttle 17 moves along guide 16, it is able to bring the drum 13 above each of the overall conveying surfaces 34, 36 of each dispensing station 19, 20, 21, 22, 23, 24, 25, 26 and stop it at this position.

In an alternative embodiment shown in FIG. 3c, the final end 40 of the conveying surface 34, 36 is disposed on top of the forming drum 13, for deposition of a strip of self-sealing material for tyres, for example.

In a further preferred embodiment (not shown) the final end 40 of the conveying surface 34, 36 is substantially disposed at the height of the rotation axis X-X of the forming drum 13, should it be necessary to spiral a semifinished product having nylon cords, for example.

The shuttle 17 further comprises actuating devices, not shown, adapted to vertically move the grip element and drum 13 secured thereto in the two ways V1, V2, along a direction orthogonal to the longitudinal extension of guide 16. The drum 13 is therefore movable between a first position at which a radially external surface thereof 13a approaches the upper conveying surface 34, 36, and a second position at which said radially external surface is moved away from said overall conveying surface 34, 36.

The feeding direction "F" of the semifinished product is perpendicular to a plane containing the rotation axis "X-X" at the winding-up point on the drum 13.

At one of the final ends of guide 16 a loading and unloading location 41 is placed where, by suitable devices not shown, each forming drum 13 can be loaded on the shuttle 17 or unloaded therefrom.

Also positioned at the loading and unloading location is an apparatus 42 for placement of the annular anchoring structures 6 and turning up of the end flaps of the carcass plies 4a, 4b and an apparatus 43 for rolling the turned-up portions, known by themselves and therefore not further described or illustrated.

In use, in accordance with the method and process of the invention, based on the recipe of the tyre to be built, installed in some or all of the "n" deposition locations (six in number in the examples shown) are "m" dispensing stations ("m" corresponding to three in FIG. 1, "m" corresponding to five in FIG. 2).

A control unit "U", only shown in FIG. 2, operatively connected to sensors and motors of apparatus 1, is programmed in such a manner that the dispensing stations lay down the respective semifinished products in a predetermined sequence on each forming drum 13.

With reference to the embodiment in FIG. 1, the shuttle 17 carries the empty forming drum 13 close to the first deposition location 18i. In this location, the dispensing station 19 feeding liner 5 has already carried out the cut to size of a strip of liner 5 lying immobile on the conveying surface 36 of the second conveyor belt 35. The forming drum 13 is lowered until it bears against the strip of liner 5 and set in rotation until it fully winds said strip of liner 5 on its radially external surface 13a while the conveying surface 36 is moving forward along the feeding direction "F" so as to help this winding operation. When winding has been completed, the shuttle 17 raises the forming drum 13 and moves it to the fourth deposition location 18iv, skipping the second 18ii and third 18iii deposition locations, for receiving the first carcass ply 4a, and then to the fifth deposition location 18v for receiving the second carcass ply 4b, in the same manner as done for liner 5, and forming a carcass sleeve.

With reference to the embodiment in FIG. 2, the shuttle 17 is moved to and stopped at the first 18i and second 18ii deposition locations, the third deposition location 18iii being skipped, and then moved to and stopped at the fourth 18iv, fifth 18v and sixth 18vi deposition locations.

With reference to both the embodiments shown (FIGS. 1 and 2), the shuttle 17 then changes its running direction and is brought back to the loading and unloading location 41 where the mentioned suitable devices pick up the forming drum 13 provided with the just formed carcass sleeve and shift it into apparatus 42 for placement of the annular anchoring structures 6 and carrying out turning up of the end flaps of the carcass plies 4a, 4b.

The forming drum 13 is then carried to apparatus 43 for rolling the turned-up portions and then to the assembling station 15.

To change the type or design of tyre being built, in the carcass building line 12 it is possible: to remove and/or add and/or replace one or more dispensing stations of semifinished products and/or change the position thereof in the deposition locations, and/or to replace the carriages and/or the reels carried thereby, and/or to change the sequence according to which the shuttle 17 brings the drum 13 to said dispensing stations of semifinished products. By suitably installing the dispensing stations of semifinished products, the drum 13 can be, for example, first brought to the sixth deposition location 18vi, subsequently to the fourth 18iv, then to the first 18i and the second 18ii, then again to the sixth 18vi and finally brought back to the loading and unloading station 41.

The invention claimed is:

1. A process for building tyres for vehicle wheels, the process comprising: forming all components belonging to a carcass sleeve of a first tyre on a first forming drum and all components belonging to a carcass sleeve of a second tyre on a subsequent second forming drum, wherein said tyre components belonging to a carcass sleeve of said first and second tyres are formed by:

loading the first forming drum at a loading and unloading location of a carcass-building line, on a single shuttle movable along a straight guide;

moving the shuttle on the straight guide to bring said shuttle to a plurality of dispensing stations of semifinished products, wherein each dispensing station is disposed in a respective deposition location, and each respective deposition location is included in a plurality of deposition locations positioned in a space succession along the straight guide, wherein at each of said dispensing stations of semifinished products, a semifinished product is laid on a radially external surface of the first forming drum carried by the shuttle for forming one of the components belonging to the carcass sleeve of the first tyre; and bringing the first forming drum provided with the components formed by the dispensing stations back to said loading and unloading location and unloading said first forming drum from said shuttle before loading the subsequent second forming drum, shifting the unloaded first forming drum provided with the components formed by the dispensing stations to an apparatus at which annular anchoring structures of the first tyre are placed and turned up portions of the carcass sleeve of the first tyre are formed, then carrying the first forming drum to an apparatus at which the turned-up portions are rolled, and then to an assembling station at which an outer sleeve is coupled to the carcass sleeve of the first tyre wherein the first forming drum is moved in a first sequence among a first set selected from the plurality of deposition locations, the first sequence being different from the space succession of said deposition locations along the straight guide and wherein the first forming drum is brought at least two times to one and the same deposition location of the first set;

wherein the subsequent second forming drum is moved in a second sequence among a second set selected from the plurality of deposition locations and wherein the subsequent second forming drum is brought at least two times to one and the same deposition location of the second set, the number of deposition locations of the first set being different than the number of deposition locations of the second set, wherein the space succession of the plurality of deposition locations remains unchanged, wherein only a single forming drum is located on and moved along the straight guide at a time between the times of loading and unloading that single forming drum on and from said shuttle, and the shuttle holds the single forming drum during the laying of the semifinished products; and wherein a running direction of said shuttle is reversed at least twice after the loading of the single forming drum onto said shuttle and before said shuttle is further reversed to return to the loading and unloading location during movement of said shuttle along the straight guide while forming components of each carcass sleeve of the first and second tyres.

2. The process as claimed in claim 1, wherein the loading and unloading location is disposed at an end of the straight guide.

3. The process as claimed in claim 1, wherein deposition of the semifinished product on the radially external surface of the first forming drum at each of said dispensing stations comprises:

moving the first forming drum close to a conveying surface of the respective dispensing station, the respective conveying surface being movable along a feeding direction;

feeding the respective semifinished product onto said respective conveying surface; and setting the first forming drum in rotation for receiving the respective semifinished product on the radially external surface.

4. The process as claimed in claim 3, wherein during the deposition onto the first forming drum at each of said dispensing stations the first forming drum is moved from an upper position to a lower position, wherein, at the lower position, the first forming drum is close to a final end of the respective conveying surface.

5. The process as claimed in claim 3, wherein during the deposition onto the first forming drum at each of said dispensing stations the first forming drum is moved from a lower position to an upper position, wherein, at the upper position, the first forming drum is close to a final end of the respective conveying surface.

6. The process as claimed in claim 1, wherein, before forming the components on the first forming drum, a dispensing station of semifinished products not used with the first forming drum is removed from one of the deposition locations and replaced with one of the dispensing stations that is used on the first forming drum.

7. The process as claimed in claim 1, wherein, before forming the components on the first forming drum, one of the dispensing stations of semifinished products is removed from one of the deposition locations and added in a different deposition location of the plurality of deposition locations.

8. The process as claimed in claim 1, wherein, before forming the components on the first forming drum, a dispensing station of semifinished products not used with the first forming drum is removed from one of the deposition locations.

9. The process as claimed in claim 1, wherein, as the first forming drum is moved to each of the dispensing stations disposed in the first set of deposition locations, the first forming drum is disposed above an end of a conveying surface of the respective dispensing stations.

10. The process as claimed in claim 1, wherein, in the first set of deposition locations, the first forming drum is lowered until the first forming drum bears against the semifinished product dispensed from the respective dispensing stations.

11. The process as claimed in claim 1, wherein, in each of said deposition locations in the first set, the semifinished product is dispensed from a removable carriage that is housed in a frame that is locked in and removable from the respective deposition location.

* * * * *